United States Patent
Moser et al.

(10) Patent No.: US 7,122,759 B2
(45) Date of Patent: Oct. 17, 2006

(54) COMPACT EARTHING SWITCH FOR GAS-INSULATED SWITCHGEAR ASSEMBLIES

(75) Inventors: Hanspeter Moser, Fislisbach (CH); Bojan Pavlovic, Zurich (CH); Daniel Bleiker, Zurich (CH); Walter Holaus, Zurich (CH)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 11/066,184

(22) Filed: Feb. 25, 2005

(65) Prior Publication Data

US 2005/0189326 A1    Sep. 1, 2005

(30) Foreign Application Priority Data

Feb. 27, 2004    (EP)    ................... 04405116

(51) Int. Cl.
*H01H 33/70*    (2006.01)
(52) U.S. Cl. ........................... 218/79; 218/80
(58) Field of Classification Search ................ 218/55, 218/65, 67, 68, 79, 80, 2, 7, 12, 14, 43, 45, 218/46, 78, 84, 153–156
See application file for complete search history.

(56) References Cited

U.S. PATENT DOCUMENTS

| 3,553,397 A | | 1/1971 | Schmitz | |
|---|---|---|---|---|
| 5,721,412 A | * | 2/1998 | Schifko et al. | ............ 218/43 |
| 5,828,025 A | | 10/1998 | Neumaier et al. | |
| 6,144,005 A | * | 11/2000 | Tanimizu et al. | ........... 218/118 |
| 6,680,453 B1 | * | 1/2004 | Rokunohe et al. | ............. 218/2 |
| 6,759,616 B1 | * | 7/2004 | Rokunohe et al. | ............. 218/2 |

FOREIGN PATENT DOCUMENTS

| EP | 1 128 509 A1 | 8/2001 |
|---|---|---|
| EP | 1 068 624 B1 | 1/2002 |
| EP | 1 361 633 A2 | 11/2003 |
| WO | WO 9962154 A1 * | 12/1999 |

OTHER PUBLICATIONS

Mamoru Okabe et al., "Serialization of Standard Gas Insulated Switchgear", Hitachi Review, 2002, pp. 169 and 172-173, vol. 51, No. 5, (Cited in the specification).

* cited by examiner

*Primary Examiner*—Elvin Enad
*Assistant Examiner*—M. Fishman
(74) *Attorney, Agent, or Firm*—Buchanan Ingersoll & Rooney PC

(57) ABSTRACT

A compact earthing switch (1') is provided by a mounting lid (10) of the gas-insulated switchgear assembly (15) having a concave physical volume (100) which extends the gas chamber (9) and by the earthing switch fixed contact (12) being mounted on an inner side (10e) of the mounting lid (10) and being arranged at least partially in the physical volume (100) of the mounting lid (10). Exemplary embodiments relate, inter alia, to: an essentially cylindrical mounting lid (10; 10a 10e); an earthing switch fixed contact (12) having a physical length (L) which is smaller than an axial physical depth (T) of the physical volume (100); and a large diameter (D) of the mounting lid (10) for simplified mounting and maintenance of active parts 7a, 7b) in the switchgear assembly (15). Advantages include: the compact design for the grounding device the ability of the earthing switch fixed contact (12) to be ready-mounted on the mounting lid (10); and the integration of the earthing switch fixed contact (12), which is integrated in the mounting lid (10), in a combined disconnector/earthing switch (1').

13 Claims, 2 Drawing Sheets

COMPACT EARTHING SWITCH FOR GAS-INSULATED SWITCHGEAR ASSEMBLIES

TECHNICAL FIELD

The invention relates to the field of high-voltage technology, in particular to electrical insulation and connection technology for grounded, gas-insulated switchgear assemblies. It is based on a dielectric bushing and an electrical high-voltage apparatus in accordance with the preamble of the independent patent claims.

PRIOR ART

Earthing switches in existing gas-insulated switchgear assemblies are mounted on special flanges in the switchgear assemblies. These flanges are either standard flanges, which are used in any connection, or even smaller flanges, which have been made especially for fitting earthing switches. The flanges for fitting the grounding device are generally too small for the active parts to be inserted through them or to be fixed during assembly. In addition, the earthing switch fixed contact is typically integrated in the active parts in the inner tube. In the case of most implementations of earthing switches today, the movable contact is moved from the outside, i.e. from the encapsulation, inwards toward the active parts.

The invention makes reference to a prior art, as is disclosed in the article by M. Okabe et al., "Serialization of Standard Gas Insulated Switchgear", Hitachi Review Vol. 51 (2002), No. 5. Here a conventional, combined disconnector/earthing switch or three-position disconnector is disclosed, in which a movable contact piece can be moved by means of a linear movement between the positions "disconnector connected", i.e. disconnector contact closed, "disconnector disconnected", i.e. disconnector contact open and "earthing switch connected", i.e. earthing switch contact closed in addition. The earthing switch fixed contact is mounted, as has been conventional to date, on a flat lid or cap or hood of the gas-insulated switchgear assembly (GIS) on the lid or cap or hood inner side and protrudes into the gas-insulated switch chamber when the lid is flanged on. As a result, the grounding device requires a relatively large amount of space in the gas-insulated switchgear assembly. The earthing switch fixed contact is electrically insulated from the GIS housing and can be short-circuited with the GIS housing via a contact bridge.

EP 1 068 624 B1 likewise discloses a combined disconnector/earthing switch. In this case, the earthing switch fixed contact is in the form of a pin-like contact piece which rests on a contact support, which for its part is held on a bolt that is passed to the outside through the GIS housing wall.

EP 1 128 509 A1 also discloses a combined disconnector/earthing switch. The earthing switch fixed contact is integrated in a conically tapering part of the GIS housing, this GIS housing part being closed by a screwed-on lid having a small diameter. This design is complex insofar as the GIS housing is especially designed for accommodating the earthing switch and is designed such that it is markedly longer on the earthing switch side, in particular for the purpose of creating a physical volume accommodating the switching path of the earthing switch.

SUMMARY OF THE INVENTION

The object of the present invention is to specify an improved, compact design for earthing switches in gas-insulated switchgear assemblies. This object is achieved according to the invention by the features of the independent claims.

The invention comprises an earthing switch, in particular for gas-insulated high-voltage switchgear assemblies, comprising an earthing switch drive, a movable earthing switch contact and an earthing switch fixed contact, the movable earthing switch contact and the earthing switch fixed contact being arranged in a gas chamber of the gas-insulated switchgear assembly, and the earthing switch being mechanically connected to the housing of the gas-insulated switchgear assembly in the region of the earthing switch fixed contact, a mounting lid or mounting cap of the gas-insulated switchgear assembly having a concave physical volume which extends the gas chamber, and the earthing switch fixed contact being mounted on an inner side of the mounting lid and being arranged at least partially in the physical volume of the mounting lid. The mounting lid thus provides a physical volume and at least partially limits or encloses this physical volume. In this manner, a mounting flange is realized having an integrated grounding device fixed contact, the earthing switch fixed contact being arranged in a very space-saving manner in the physical volume of the mounting lid. The earthing switch fixed contact is mounted such that it rests at least partially in the physical volume and protrudes at most partially out of the physical volume and into the gas chamber enclosed by the GIS housing. Since the earthing switch fixed contact is fixed to the housing of the gas-insulated switchgear assembly via a mounting lid or mounting flange, it can be mounted and dismantled in a very simple manner.

The exemplary embodiment as claimed in claim 2 has the advantage that the earthing switch fixed contact is arranged completely in the physical volume of the mounting lid or mounting flange. This arrangement of the earthing switch fixed contact on and in the mounting lid makes it possible to markedly reduce the space requirement for the grounding device, both in comparison to previous arrangements having an earthing switch drive on the inside and, very particularly, in comparison to laterally fitted earthing switches, the fixed contacts of which are arranged in the active parts of the gas-insulated switchgear assembly (GIS).

The exemplary embodiment as claimed in claim 3 has the advantage that the mounting lid has a simple shape and at the same time encloses one half of a large physical volume.

The exemplary embodiment as claimed in claim 4 has the advantage that the earthing switch drive is arranged in the gas-insulated switchgear assembly in a space-saving manner owing to its mounting at one end relative to a longitudinal axis of the switchgear assembly section.

The exemplary embodiments as claimed in claims 5 and 6 have the advantage that the mounting flange provides a large-area access to the interior of the GIS assembly, with the result that active parts can be inserted, mounted, have maintenance carried out on them or be replaced through the mounting flange in a very simple manner, without it being necessary to remove the housing. Since the mounting flange is larger than a standard flange and, in particular, as large as the GIS housing, relatively large active parts may also be used.

Claim 7 relates to an advantageous refinement of the earthing switch drive, in which the drive shaft for the inner advancement of the movable earthing switch contact is guided preferably centrally through the mounting lid.

Claim 8 relates to an embodiment for the earthing switch as an insulated earthing switch which is advantageous, in particular, for precise electrical measurements using grounded active parts of the switchgear assembly.

Claim 9 specifies an advantageous integration of the compact earthing switch in a combined disconnector/earthing switch.

Claim 10 relates to an electrical switchgear assembly comprising an earthing switch as described above and having the advantages specified there.

Further embodiments, advantages and applications of the invention are described in combinations of the claims and in the description below and the figures.

BRIEF DESCRIPTION OF THE DRAWINGS

In the figures, the same parts are provided with the same references.

WAYS OF IMPLEMENTING THE INVENTION

Figure 1:
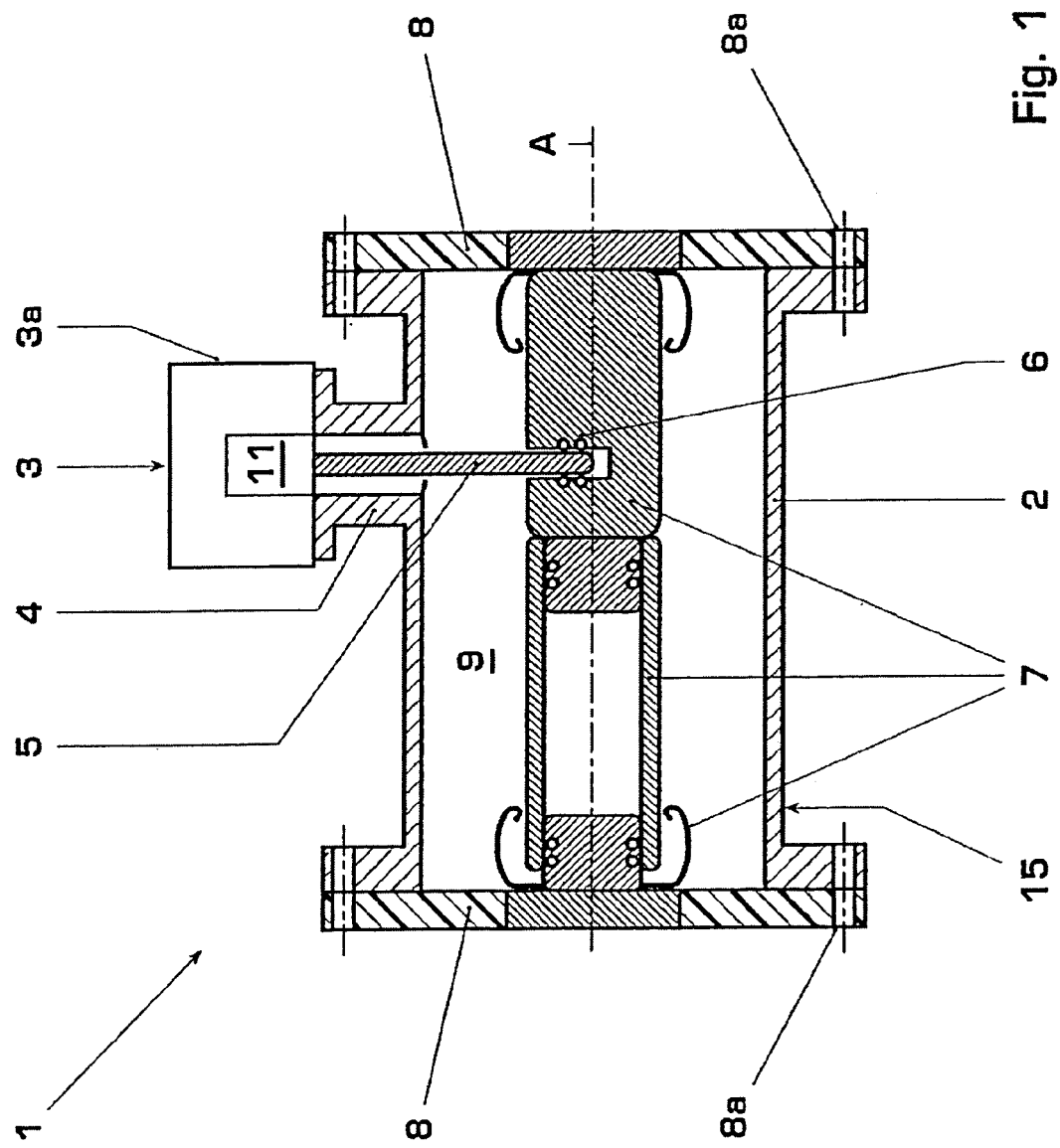
FIG. 1 shows a schematic illustration, in cross section, of a conventional, prior art earthing switch which is fitted laterally on the gas-insulated switchgear assembly.
Figure 2:
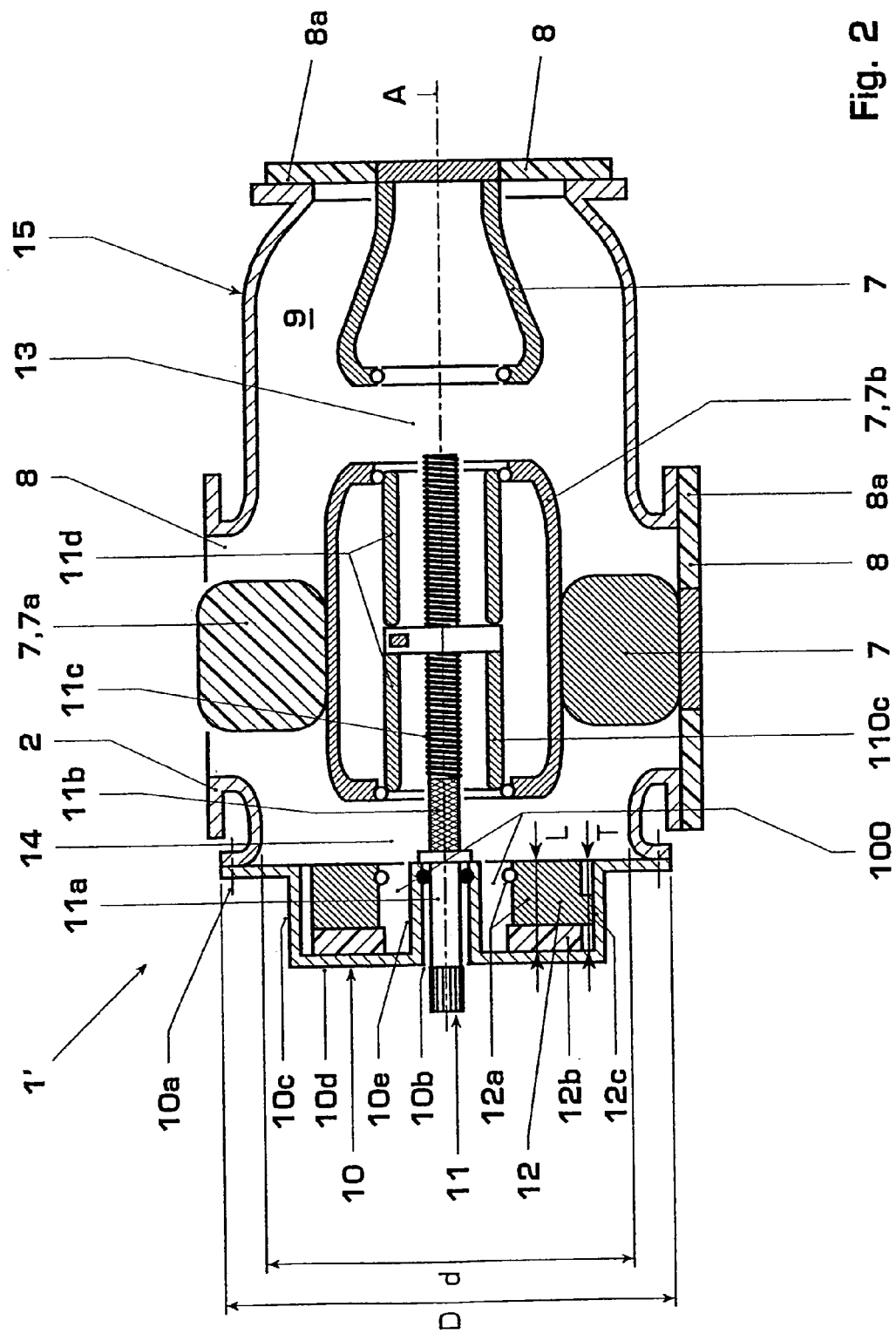
FIG. 2 shows a schematic illustration, in cross section, of an exemplary embodiment of a compact earthing switch which is integrated in the mounting lid according to the invention.

FIG. 1 shows a conventional earthing switch 1 in an encapsulated, gas-insulated switchgear assembly 15. The housing 2 of the gas-insulated switchgear assembly 15 encloses a gas chamber 9, which is preferably filled with $SF_6$ gas at a few bars of pressure. Located in the gas chamber 9 are voltage- and current-carrying active parts 7 of the switchgear assembly 15, which are borne by insulators 8 and possibly a mounting holder 7a, as shown in FIG. 2. Instead of the holder 7a, an optional current connection 7a may also be provided, as shown in FIG. 2. The insulators 8 may be, for example, post insulators 8 or gas-tight partition insulators 8, which are fixed to the housing 2 via flanges 8a.

The grounding device fitting 3 having the earthing switch drive 11 is flanged, together with its grounding device or earthing switch housing 3a, laterally onto the GIS housing 2 via a flange 4. A movable earthing switch contact pin 5 can be moved by the drive 11 into an earthing switch fixed contact 6, which is provided in an active part 7 of the switchgear assembly 15. During normal operation of the switchgear assembly 15, the pin 5 is withdrawn, and the active parts 7 are subjected to a high voltage and/or carry the operating current or short-circuit current.

FIG. 2 shows a grounding device or earthing switch 1' which is integrated according to the invention in the mounting lid 10. Said earthing switch 1' is illustrated by way of example using a combined disconnector/earthing switch 1'. In turn, an earthing switch drive 11 (illustrated without a motor drive unit provided outside), a movable earthing switch contact 110c and an earthing switch fixed contact 12 are provided. The movable earthing switch contact 110c and the earthing switch fixed contact 12 are arranged in a gas chamber 9 of the gas-insulated switchgear assembly 15. The earthing switch 1' is mechanically connected to the housing 2 of the gas-insulated switchgear assembly 15 in the region of the earthing switch fixed contact 12. According to the invention, the mounting lid 10 of the gas-insulated switchgear assembly 15 has a concave physical volume 100, which extends the gas chamber 9, and the earthing switch fixed contact 12 is mounted on an inner side 10e of the mounting lid 10 and is arranged at least partially in the physical volume 100 of the mounting lid 10. Preferred exemplary embodiments are specified below.

The earthing switch fixed contact 12, based on an axial extent perpendicular to the mounting lid 10, i.e. along the axis A of the switchgear assembly section 15, advantageously has a physical length L which is smaller than or equal to a physical depth T of the physical volume 100. As illustrated, the mounting lid 10 may be essentially cylindrical and may have an essentially cylindrical physical volume 100 for the purpose of accommodating the earthing switch fixed contact 12. In this case, a lid side wall 10c is essentially in the form of a cylinder sheath 10c, which extends along the axis A and away from the active parts 7 over the physical depth T and is sealed off at the ends by an essentially circular lid base 10d. The lid inner side 10e then also provides an essentially circular or, as illustrated, annular, preferably planar mounting face for the earthing switch fixed contact 12.

The mounting lid 10 with the integrated earthing switch fixed contact 12 is preferably arranged at one end on the housing 2 of the gas-insulated switchgear assembly 15. As a result, a very compact design for the combined disconnector/grounding device 1' is achieved and, in particular, a short physical length along the axis A. The isolating path 13 and the grounding path 14 are in this case arranged by way of example in series behind one another. Nevertheless, compact outer dimensions are achieved for the disconnector/earthing switch 1'.

For a large-area access to the interior of the disconnector/earthing switch 1', the mounting lid 10 shall be larger than a standard flange of the gas-insulated switchgear assembly 15. The mounting lid 10 preferably has an opening diameter D, which is essentially the same as a diameter d (in this case illustrated by way of example as the inner diameter d) of the gas-insulated switchgear assembly 15. In other words, the mounting flange 10a of the mounting lid 10 is selected to be as large as is permitted for the outer dimensions of the switchgear assembly section 15 or the switching device 1'. As a result, active parts 7 of the switchgear assembly 15 and also parts of the grounding device or disconnector/earthing switch 1' can easily be installed, removed or have maintenance carried out on them through the opening provided by the mounting lid 10.

In the exemplary embodiment illustrated, the mounting lid 10 has a cutout 10b for the purpose of passing through the earthing switch drive 11, in particular a drive shaft 11a and an isolating shaft 11b, for the movable earthing switch contact 110c. In particular, the earthing switch drive 11 comprises a movable spindle 11b, which is driven by the shaft 11a, 11b, for the linear driving of the tubular, movable earthing switch contact 110c arranged in the gas chamber 9. In this exemplary configuration, the movable contact piece 110c can be arranged in the interior 9 of the switchgear assembly 15 in the shield 7b and can be moved outwards from the inside, with the result that the earthing switch fixed contact 12 can be integrated on the mounting lid 10 provided on the housing side.

If an embodiment having an insulated earthing switch fixed contact 12 is required for the earthing switch 1', the electrical insulation required for this purpose and the electrical connections are also integrated in the mounting lid 10. For this purpose, the earthing switch fixed contact 12 has an electrical insulation 12b between its contact system 12a and the mounting lid 10. In particular, the earthing switch fixed contact 12 has an electrically insulated bushing 12c through the housing 2 to the outside. In order to short-circuit the grounding device 1' with the housing 2, a conductive bracket (not illustrated here) can be mounted in a manner known per se between the passed-through grounding contact 12c and the housing 2.

The earthing switch 1' having the earthing switch fixed contact 12 integrated according to the invention in the mounting lid 10 may be, as shown, part of a combined disconnector/earthing switch 1' and have, in particular, a common disconnector/earthing switch drive 11. The earthing switch 1' having an earthing switch fixed contact 12 integrated in the mounting lid 10 may also be realized in an elbow disconnector, in another embodiment of the combined disconnector/grounding device 1' or separately, i.e. without a disconnector function. Other earthing switch drives 11 are also compatible with the invention and are thus also considered to be disclosed herein.

The earthing switch fixed contact 12 can be ready-mounted completely in the mounting lid 10. In this case, it can be fitted, together with the mounting lid 10, in a particularly simple manner to the housing 2 of the switching device 1', in particular can be flanged on via the flange 10a. Overall, the switching device 1' integrated in the mounting lid 10 simplifies assembly, inspection and maintenance of the switchgear assembly 15, since the active parts 7 can be built in, removed and replaced through the mounting flange 10 without it being necessary to remove the housing 2.

The earthing switch 1' is particularly suitable for gas-insulated medium- or high-voltage switchgear assemblies 15. A switchgear assembly 15 having such an earthing switch 1' is also claimed.

LIST OF REFERENCES

1 Conventional grounding device or earthing switch (fitted laterally)
1' Combined disconnector/earthing switch of compact design
2 GIS housing
3 Earthing switch fitting having earthing switch drive
3a Earthing switch housing
4 Flange for earthing switch fitting
5 Movable earthing switch contact pin
6 Earthing switch fixed contact
7 Active parts of the switchgear assembly, current conductor (at high-voltage potential)
7a Holder, optional current connection
7b Shield for movable contact tube
8 Insulator, post insulator, partition insulator
8a Insulator flange
9 Gas chamber, $SF_6$
10 Mounting lid, mounting flange having integrated earthing switch fixed contact
10a Flanged-on section for mounting lid
10b Cutout for disconnector/earthing switch drive, drive bushing
10c Lid side wall, cylinder sheath
10d Lid base, cylinder base
10e Lid inner side
100 Mounting lid volume
11 Disconnector/earthing switch drive
11a Drive shaft
11b Insulating shaft
11c Spindle
11d Contact tube, switching rod
110c Movable earthing switch contact
12 Earthing switch fixed contact
12a Contact system
12b Insulation for insulated earthing switch
12c Earthing switch/housing bushing
13 Isolating path
14 Grounding path
15 Gas-insulated switchgear assembly
A Axis of the switchgear assembly section
d Diameter of the GIS housing
D Diameter of the mounting lid
L Axial physical length of the earthing switch fixed contact
T Axial physical depth of the physical volume

The invention claimed is:

1. An earthing switch comprising an earthing switch drive, a movable earthing switch contact and an earthing switch fixed contact, the movable earthing switch contact and the earthing switch fixed contact being arranged in a gas chamber of the gas-insulated switchgear assembly, in addition the earthing switch being mechanically connected to a housing of the gas-insulated switchgear assembly in the region of the earthing switch fixed contact, wherein
   a) a mounting lid for mounting the earthing switch fixed contact of the gas-insulated switchgear assembly has a concave physical volume which extends the gas chamber, and
   b) the earthing switch fixed contact is mounted on an inner side of the mounting lid and is arranged at least partially in the physical volume of the mounting lid, wherein the earthing switch fixed contact, based on an axial extent perpendicular to the mounting lid, has a physical length which is smaller than or equal to a physical depth of the physical volume.

2. The earthing switch as claimed in claim 1, wherein the earthing switch fixed contact, based on an axial extent perpendicular to the mounting lid, has a physical length which is smaller than or equal to a physical depth of the physical volume.

3. The earthing switch as claimed in claim 1, wherein the mounting lid is essentially cylindrical and has an essentially cylindrical physical volume for the purpose of accommodating the earthing switch fixed contact.

4. The earthing switch as claimed in claim 1, wherein the mounting lid, with the earthing switch fixed contact being integrated in it, is arranged at one end on the housing of the gas-insulated switchgear assembly.

5. The earthing switch as claimed in claim 1, wherein the mounting lid is larger than a conventional flange for fitting a grounding device which is too small for active parts to be inserted through it or to be fixed during assembly.

6. The earthing switch as claimed in claim 1, wherein the mounting lid has an opening diameter, which is essentially the same as a diameter of the gas-insulated switchgear assembly.

7. The earthing switch as claimed in claim 1, wherein the mounting lid has a cutout for the purpose of passing through the earthing switch drive for the movable earthing switch contact.

8. The earthing switch as claimed in claim 1, wherein the earthing switch fixed contact has an electrical insulation between its contact system and the mounting lid.

9. The earthing switch as claimed in claim 1, wherein the earthing switch is part of a combined disconnector/earthing switch device and has a common disconnector/earthing switch drive.

10. An electrical switchgear assembly, wherein an earthing switch as claimed in claim 1.

11. The earthing switch as claimed in claim 1, wherein the earthing switch is for gas-insulated high-voltage switchgear assemblies.

12. The earthing switch as claimed in claim 7, wherein the earthing switch drive comprises a movable spindle for the linear drive of the tubular, movable earthing switch contact arranged in the gas chamber.

13. The earthing switch as claimed in claim 8, wherein the earthing switch fixed contact has an electrically insulated bushing through the housing to the outside.

* * * * *